(12) United States Patent
Zhang et al.

(10) Patent No.: US 12,192,687 B2
(45) Date of Patent: Jan. 7, 2025

(54) SERVICE TRANSMISSION METHOD AND APPARATUS, SENDING END AND STORAGE MEDIUM

(71) Applicant: ZTE CORPORATION, Shenzhen (CN)

(72) Inventors: Weiliang Zhang, Shenzhen (CN); Mingsheng Li, Shenzhen (CN); Zhuang Ma, Shenzhen (CN); Yufeng Li, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 108 days.

(21) Appl. No.: 17/906,219

(22) PCT Filed: Apr. 29, 2021

(86) PCT No.: PCT/CN2021/090866
§ 371 (c)(1),
(2) Date: Sep. 13, 2022

(87) PCT Pub. No.: WO2021/219061
PCT Pub. Date: Nov. 4, 2021

(65) Prior Publication Data
US 2023/0121842 A1  Apr. 20, 2023

(30) Foreign Application Priority Data
Apr. 30, 2020 (CN) .......................... 202010366934.2

(51) Int. Cl.
*H04Q 11/00* (2006.01)
*H04B 10/40* (2013.01)
(Continued)

(52) U.S. Cl.
CPC ......... *H04Q 11/0067* (2013.01); *H04B 10/40* (2013.01); *H04B 10/50* (2013.01);
(Continued)

(58) Field of Classification Search
None
See application file for complete search history.

(56) References Cited

U.S. PATENT DOCUMENTS

| | | | |
|---|---|---|---|
| 7,130,264 B2* | 10/2006 | Wiebe | H04L 47/762 370/468 |
| 2003/0194234 A1* | 10/2003 | Sridhar | H04J 14/0283 398/43 |

(Continued)

FOREIGN PATENT DOCUMENTS

| | | |
|---|---|---|
| CN | 105207956 A | 12/2015 |
| CN | 110933532 A | 3/2020 |
| WO | 2011019992 A1 | 2/2011 |

OTHER PUBLICATIONS

International Searching Authority. International Search Report and Written Opinion for PCT Application No. PCT/CN2021/090866 and English translation, mailed Jul. 26, 2021, pp. 1-9.

(Continued)

*Primary Examiner* — Darren E Wolf
(74) *Attorney, Agent, or Firm* — Vivacqua Crane, PLLC

(57) ABSTRACT

A service transmission method and apparatus, a sender and a storage medium are disclosed. The service transmission method, applied to at a sender, may include: preempting, by one transmission entity, a transmission opportunity of another transmission entity to perform service transmission.

20 Claims, 4 Drawing Sheets

Attribute information of the transmission opportunity or the transmission entity is configured — S210

One transmission entity preempts a transmission opportunity of another transmission entity to perform service transmission — S220

After the preemption, the preempted transmission entity continues to perform service transmission — S230

(51) Int. Cl.
*H04B 10/50* (2013.01)
*H04B 10/60* (2013.01)
(52) U.S. Cl.
CPC ...... *H04B 10/60* (2013.01); *H04Q 2011/0086* (2013.01); *H04Q 2213/1301* (2013.01)

(56) References Cited

U.S. PATENT DOCUMENTS

| | | | |
|---|---|---|---|
| 2006/0233197 A1* | 10/2006 | Elmoalem | H04J 3/1694 370/468 |
| 2015/0063805 A1* | 3/2015 | Lamb | H04L 12/2885 398/58 |
| 2021/0099231 A1* | 4/2021 | Schaefer | H04B 10/27 |

OTHER PUBLICATIONS

European Patent Office. Extended European Search Report for EP Application No. 21795980.7, mailed May 3, 2023, pp. 1-29.

Jia, W., et al. "A Hardware-based Preemptive Dynamic Bandwidth Allocation Mechanism for Real-time Applications in EPONs," IEEE 4th International Congress on Ultra Modern Telecommunication and Control Systems and Workshops, Oct. 2012.

Jia, W., et al. "Performance Evalution of IEEE 802.1Qbu: Experimental and Simulation Results," IEEE 38th Annual Conference on Loval Computer Networks, Oct. 2013, pp. 659-662.

* cited by examiner

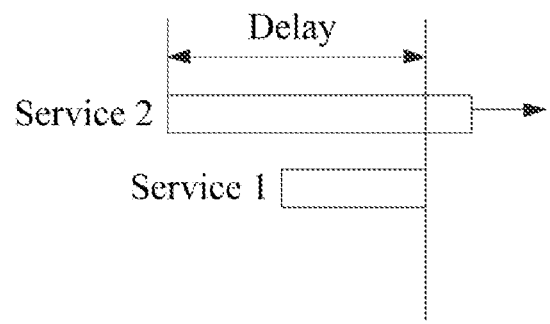
Fig. 1
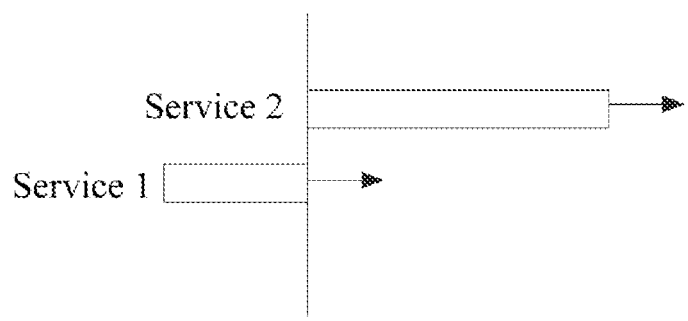
Fig. 2
| One transmission entity preempts a transmission opportunity of another transmission entity to perform service transmission | S110 |
Fig. 3

SERVICE TRANSMISSION METHOD AND APPARATUS, SENDING END AND STORAGE MEDIUM

CROSS-REFERENCE TO RELATED APPLICATION

This application is a national stage filing under 35 U.S.C. § 371 of international application number PCT/CN2021/090866, filed Apr. 29, 2021, which claims priority to Chinese patent application No. 202010366934.2, filed Apr. 30, 2020. The contents of these applications are incorporated herein by reference in their entirety.

TECHNICAL FIELD

Embodiments of the present application relate to, but not limited to, the technical field of communication, and more particularly, to a service transmission method and apparatus, a sender and a storage medium.

BACKGROUND

A Passive Optical Network (PON) is a typical passive optical network. A PON system usually comprises an Optical Line Terminal (OLT) at the local side, an Optical Network Unit (ONU) at the user side and an Optical Distribution Network (ODN).

In a traditional PON system, when the ONU sends a received service to the OLT, if the ONU is sending a low-priority service when a high-priority service arrives at the ONU, there is a need to wait for the low-priority service to be sent before sending the high-priority service. As shown in FIG. 1, a service 1 has a higher priority than a service 2. When the service 1 arrives at the ONU, the service 2 is being sent. At this time, the service 2 has to wait to be sent before the service 1 is sent. As shown in FIG. 2, this transmission mode causes the transmission of the high-priority service to have a certain delay, and the magnitude of the delay is shown in FIG. 1. The larger the amount of unsent data of the service 2 is, the greater the transmission delay of the service 1 is, especially for a time-sensitive service, so that the timeliness of this service is directly affected.

SUMMARY

Embodiments of the present application provide a service transmission method and apparatus, a sender and a storage medium to reduce a transmission delay of a time-sensitive service.

In accordance with an aspect of the present application, an embodiment provides a service transmission method applied to a sender. The method includes a following step: preempting, by one transmission entity, a transmission opportunity of another transmission entity to perform service transmission.

In accordance with an aspect of the present application, an embodiment further provides a service transmission apparatus arranged at a sender. The apparatus includes: a first control module configured to control one transmission entity to preempt a transmission opportunity of another transmission entity to perform service transmission.

In accordance with an aspect of the present application, an embodiment further provides a sender, including: a controller; a transmission entity configured to transmit a service; and a memory configured to store one or more programs which, when executed by the controller, cause the controller to implement the service transmission method as described above.

In accordance with an aspect of the present application, an embodiment further provides a storage medium storing a computer program which, when executed by a controller, causes the controller to implement the service transmission method as described above.

BRIEF DESCRIPTION OF DRAWINGS

FIG. 1 is a schematic diagram of data sending when high-priority data arrives in an existing PON system;

FIG. 2 is a schematic diagram of showing start of sending of high-priority data in an existing PON system;

FIG. 3 is a flowchart of a service transmission method provided in an embodiment of the present application;

DETAILED DESCRIPTION

Figure 4:
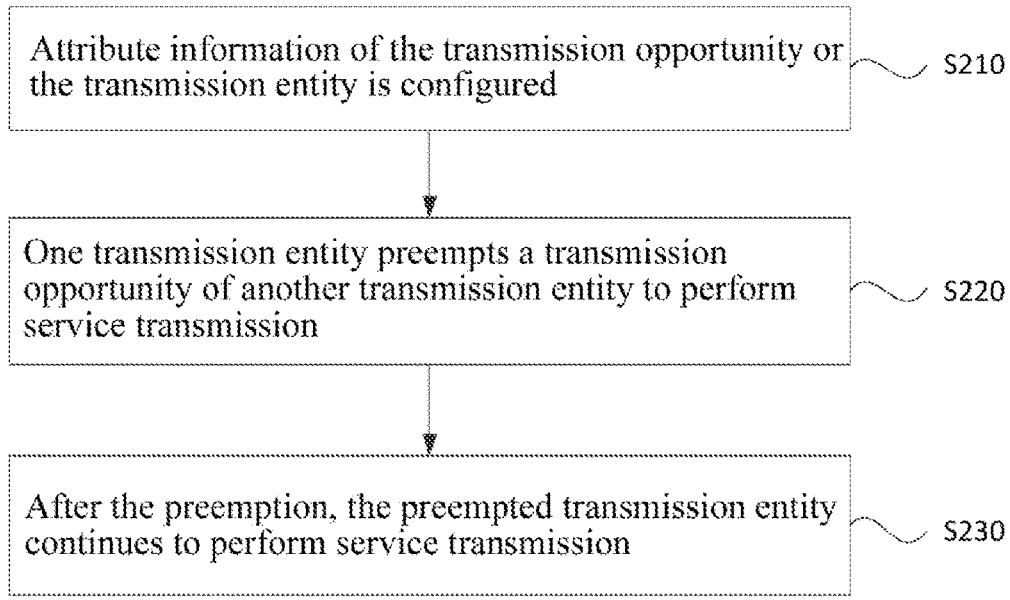
FIG. 4 is a flowchart of another service transmission method provided in an embodiment of the present application.

The present application will be further illustrated in detail with reference to the drawings and embodiments below. It should be understood that the embodiments described here are only used to illustrate the present application, and are not intended to limit the present application. Furthermore, it should be noted that, for the convenience of description, the drawings only show some but not all the structures related to the present application. In addition, the embodiments in the present application and the features in the embodiments may be combined with each other without conflict.

FIG. 3 is a flowchart of a service transmission method provided in an embodiment of the present application. This embodiment is applied to service transmission of a Passive Optical Network (PON) system to reduce a transmission delay of a time-sensitive service. The method may be executed by a service transmission apparatus which may be implemented by means of software and/or hardware, and is generally integrated in a sender which may be either an Optical Network Unit (ONU) or an Optical Line Terminal (OLT). If the sender is an ONU, a receiver is an OLT, and if the sender is an OLT, the receiver is an ONU, where a transmission direction from the ONU to the OLT is referred to as an uplink direction, and a transmission direction from the OLT to the ONU is referred to as a downlink direction. The uplink direction is similar to the downlink direction in service transmission process. In the embodiment, the uplink direction is taken as an example, and is applied to a same ONU. Referring to FIG. 3, the method includes a following step of S110: At S110, one transmission entity preempts a transmission opportunity of another transmission entity to perform service transmission.

A service transmission process in this embodiment may be implemented in an active way or a passive way, where the active way is that the transmission entity actively preempts the transmission opportunity to perform service transmission, and the passive way is that the transmission entity preempts the transmission opportunity to perform service transmission under control, for example, a certain one transmission entity preempts a transmission opportunity of another transmission entity under the control of a controller. In this embodiment, the passive way is taken as an example. A transmission entity is an apparatus used to transmit a service received by a sender to a receiver. A transmission opportunity is an opportunity for the transmission entity to perform service transmission, and the transmission entity performs service transmission when having the transmission opportunity. In this embodiment, the transmission opportunity of the transmission entity may be obtained by preemption, especially when a Time Sensitive Network (TSN) service is transmitted, a transmission delay of the TSN service may be reduced by preempting a transmission opportunity.

In some embodiments, whether a transmission entity can be preempted may be determined according to identification information of the transmission entity. For example, when a certain transmission entity is identified as being allowed to be preempted, it means that all transmission opportunities of the transmission entity can be preempted. Whether a transmission opportunity can be preempted may be determined according to identification information of the transmission opportunity. For example, when a certain transmission opportunity is identified as being allowed to be preempted, it means that the transmission opportunity can be preempted. Generally, the identification information of the transmission entity may be set according to a priority of the transmission entity, for example, a high-priority transmission entity may preempt a low-priority transmission entity.

Transmission entities with different priorities may correspond to services with different priorities. The priorities of the services may be determined by the user side, and then sent to the sender through corresponding ports of the sender. Priorities of corresponding services are obtained by the sender according to different ports, and may also be determined by the sender. For example, the user side sends services to the sender through a same port in the form of data packets, and the sender determines priorities of all the services by parsing the data packets. After receiving the services, the sender may allocate the services to corresponding transmission entities according to the priorities of the services, and the transmission entities send the services to the receiver. An allocation rule is not limited in the embodiment, for example, a high-priority service may be allocated to a high-priority transmission entity, and a low-priority service may be allocated to a low-priority transmission entity. For example, in one case, a transmission entity A is identified as being allowed to preempt, and a transmission entity B is identified as being allowed to be preempted. When a high-priority TSN service arrives at the transmission entity A, the transmission entity A may be controlled to preempt a transmission opportunity of the transmission entity B, so that the transmission entity A may preemptively transmit the high-priority TSN service, thereby reducing a transmission delay of the high-priority service.

An embodiment of the present application provides a service transmission method. The method includes following step: preempting, by one transmission entity, a transmission opportunity of another transmission entity to perform service transmission. Compared with some cases, the transmission entity of this scheme can implement service transmission by preempting a transmission opportunity, effectively reducing a transmission delay of a service.

FIG. 4 is a flowchart of another service transmission method provided in an embodiment of the present application.

At S210, attribute information of the transmission opportunity or the transmission entity is configured.

The attribute information of the transmission opportunity includes a preemption attribute of the transmission opportunity. The attribute information of the transmission entity includes a priority attribute and/or a preemption attribute of the transmission entity. The preemption attribute of the transmission opportunity is configured by an OLT and configured to identify whether the transmission opportunity is allowed to be preempted. In one case, the transmission opportunity may be a bandwidth, and the OLT may identify the bandwidth that is allowed to be preempted in a BWmap of bandwidth allocation. In the embodiment, a type of the bandwidth is not limited, for example, the bandwidth may be one or more of a fix bandwidth (fix), an assured bandwidth (Assured), a non-assured bandwidth (non-Assured), and a best-effort bandwidth (Best-Effort).

Figure 5:
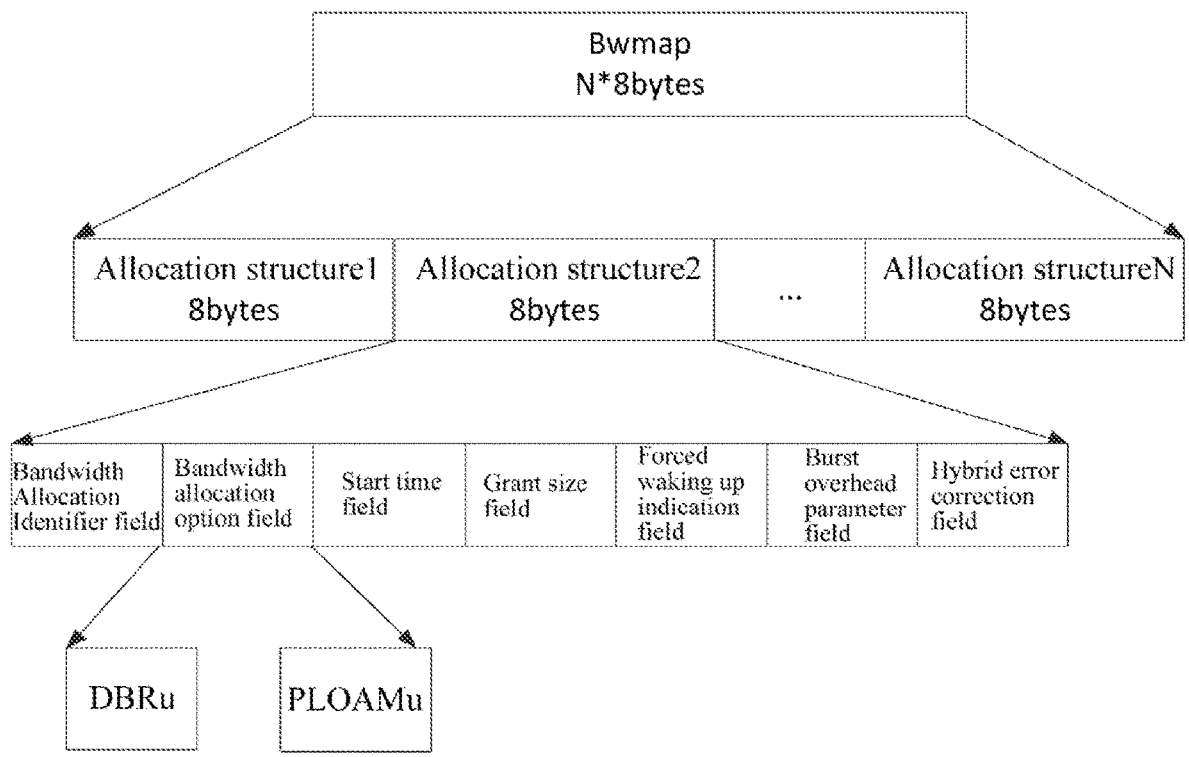
FIG. 5 is a structural diagram of a BWmap provided in an embodiment of the present application.

FIG. 5 is a structural diagram of a BWmap provided by an embodiment of the present application.

Referring to FIG. 5, the BWmap includes N Allocation structures configured to allocate the bandwidth allocated by the OLT to the ONU. Each allocation structure includes a bandwidth Allocation Identifier (Alloc-ID) field, a bandwidth allocation option (Flags) field, a start time (StartTime) field, a grant size (Grant Size) field, a forced waking up indication (FWI) field, burst overhead parameter (Bprofile) field and a hybrid error correction (HEC) field. Flags refer to the option of bandwidth allocation, which takes up two bits. One bit is used to indicate whether the ONU sends an uplink dynamic bandwidth report (DBRu), and the other bit is used to indicate whether the ONU sends an uplink Physical Layer Operations, Administration and Maintenance upstream (PLOAMu) message. StartTime indicates a position of a first byte of the XG-PON transmission convergence burst (XGTC burst) sent by the ONU in an uplink frame of 125 us. When the ONU receives an allocation structure, if the ONU judges that the allocation structure is allocated to itself according to a bandwidth allocation identifier, the ONU will start sending data in a transmission container corresponding to the bandwidth allocation identifier at a time indicated by the start time in the allocation structure. A length of the sent data is a length of data that is parsed by the ONU according to the grant size in the allocation structure and can be sent by the ONU.

In some embodiments, the StartTime field and the Grant Size field may be reduced, and the Flags field may be expanded, to indicate whether the bandwidth is allowed to be preempted in the Flags field. For example, the StartTime field and the Grant Size field are respectively reduced from an original 16 bits to 14 bits, and 4 bits are added to the Flags field. In an identification mode, when the bandwidth is allowed to be preempted, the 4 bits may be set to 1, and when the bandwidth is not allowed to be preempted, the 4 bits may be set to 0. In another identification mode, the four bits may be set to one of 0, 1, 2, . . . , 7, and different values represent different priorities, for example, 0 represents a lowest priority, 7 represents a highest priority. A bandwidth with a low priority can be preempted by a bandwidth with a high priority. Certainly, other identification modes may also be adopted, which are not limited in the embodiments.

The priority attribute and preemption attribute of the transmission entity may be configured in the ONU, where the priority attribute is used to identify a priority of the transmission entity. In some embodiments, an attribute may be added to an ONU Management and Control Interface (OMCI) attribute of the transmission entity to identify the priority of the transmission entity, and a transmission entity with a high priority may preempt a transmission opportunity of a transmission entity with a low priority. The preemption attribute of the transmission entity is used to identify whether the transmission entity is allowed to preempt. In some embodiments, an Alloc-ID may be identified and the Alloc-ID is used to uniquely identify the transmission entity, or an attribute may be added to the OMCI attribute to identify whether the transmission entity is allowed to preempt. When a certain transmission entity is identified as being allowed to be preempted, it means that all transmission opportunities of the transmission entity can be preempted, for example, when the transmission opportunities are bandwidths, it means that all bandwidths allocated to the transmission entity can be preempted.

At S220, one transmission entity preempts a transmission opportunity of another transmission entity to perform service transmission.

In some embodiments, the transmission entity includes a transmission channel (GEM Port) and a transmission container. The transmission channel is configured to send a service received by the sender to the transmission container, and the transmission container sends the service to the receiver. A sender may include one or more transmission entities, one transmission entity includes one transmission container, and one or more transmission channels may be integrated on one transmission container. In the embodiments, that a sender includes multiple transmission entities and multiple transmission channels are integrated on one transmission container is taken as an example. Different transmission channels may have different priorities, and different transmission containers may have different priorities. The transmission container includes an uplink transmission container and a downlink transmission container. The uplink transmission container is configured for service transmission in an uplink direction, and the downlink transmission container is configured for service transmission in a downlink direction. For the convenience of description, in the embodiments, the uplink transmission container is referred to as a Transmission CONT (T-CONT), the downlink transmission container is referred to as a slice, the transmission entity that preempts the transmission opportunity is referred to as a preempting transmission entity, and the transmission entity of which the transmission opportunity is preempted is referred to as a preempted transmission entity.

In one case, if the preempted transmission entity is not currently transmitting a service, the preempting transmission entity preempts a transmission opportunity of the preempted transmission entity to perform service transmission. This case may be applied to preemption between different T-CONTS. In an example, the transmission entity being a T-CONT, and the transmission opportunity being a bandwidth are taken as an example, when a service arrives at a preempting T-CONT, if a preempted T-CONT is not currently transmitting a service, the preempting T-CONT may directly preempt a bandwidth of the preempted T-CONT to complete the transmission of its own service.

In another case, if the preempted transmission entity is currently transmitting a service, after the preempted transmission entity completes service transmission, the preempting transmission entity preempts the transmission opportunity of the preempted transmission entity to perform service transmission. In an example, when the transmission entity is a T-CONT, if a transmission channel A of the preempted T-CONT is currently transmitting a service, after the transmission channel A of the preempted T-CONT completes service transmission, the preempting T-CONT preempts remaining bandwidth of the preempted T-CONT, and the preempted T-CONT suspends transmission. That the transmission channel A completes service transmission means that transmission channel A completes the transmission of data packets, that is, when the transmission channel A is transmitting a certain data packet, the preempting T-CONT may preempt the remaining bandwidth of the preempted T-CONT after the transmission channel A completes the transmission of a current data packet.

In another case, if the preempted transmission entity is currently transmitting a service, the preempting transmission entity preempts a transmission opportunity of the preempted transmission entity, and the preempted transmission entity suspends the transmission of the current service. In an example, when the transmission entity is a T-CONT, if a transmission channel A of the preempted T-CONT is currently transmitting a service, the transmission channel A of the preempted T-CONT suspends the transmission of the current service, and the preempting T-CONT preempts the remaining bandwidth of the preempted T-CONT. In this case, preemption occurs between transmission channels as well as between T-CONTs, so the transmission delay of the service can be further reduced. When the transmission entity is a transmission channel, if the preempted transmission channel is currently transmitting a service, a preempting transmission channel preferentially transmits a service, and the preempted transmission channel suspends the transmission of the current service. In this case, preemption may occur between different transmission channels of a same T-CONT.

At S230, after the preemption, the preempted transmission entity continues to perform service transmission.

In an example, when the transmission entity is a transmission channel, if the transmission of the current service is suspended by a low-priority transmission channel due to the preemption of a high-priority transmission channel, the low-priority transmission channel continues to transmit the uncompleted service after the preemption. When the transmission entity is a T-CONT, if the preempted T-CONT is not currently transmitting a service, after the preemption, the preempted T-CONT performs service transmission after obtaining the transmission opportunity.

On the basis of the above embodiment, a data acquisition mode of the transmission entity may also be changed to allow one transmission entity to preempt a transmission opportunity of another transmission entity. Correspondingly, before one transmission entity preempts a transmission opportunity of another transmission entity to perform service transmission, the method further includes:

acquiring, by the transmission entity, a data segment to be transmitted at a set interval; and when the transmission entity is preempted, ending, by the transmission entity, acquisition of the data segment to be transmitted and sending the acquired data segment to be transmitted.

Traditional service transmission is performed in the form of complete data packets, that is, when a service arrives at a high-priority transmission entity, if a low-priority transmission entity is transmitting a service, the high-priority transmission entity may wait for the low-priority transmission entity to finish the data packet transmission before the high-priority transmission entity can transmit the service, resulting in a certain transmission delay of a high-priority service. This embodiment supports preemption among transmission entities by changing a data acquisition mode of the transmission entities. In some embodiments, the transmission entity can acquire the data segments to be transmitted at set intervals. When data arrives at the high-priority transmission entity, the high-priority transmission entity can preempt the transmission opportunity of the low-priority transmission entity at any time for preemptive transmission, thus reducing the transmission delay. The time intervals may be kept constant, for example, data segments to be transmitted may be acquired at every fixed time interval, or may be randomly changed or changed according to a certain rule, which is not limited herein. The same holds true for the size of the data segments to be transmitted. In one case, a transmission container may be understood as a group of transmission channels. After a data acquisition mode of the transmission container is changed, a data acquisition mode of the transmission channels under the transmission container is changed correspondingly, and the change mode is identical.

Figure 6:
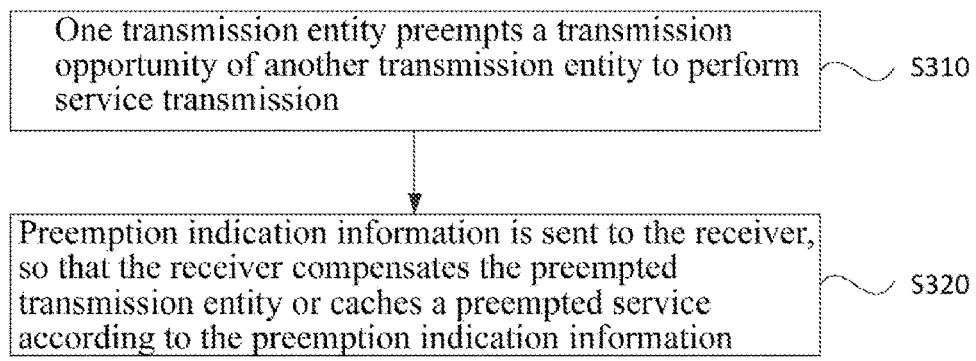
FIG. 6 is a flowchart of another service transmission method provided in an embodiment of the present application.

FIG. 6 is a flowchart of another service transmission method provided in an embodiment of the present application. The method may include steps S310 to S320.

At S310, one transmission entity preempts a transmission opportunity of another transmission entity to perform service transmission.

At S320, preemption indication information is sent to a receiver, so that the receiver compensates the preempted transmission entity or caches a preempted service according to the preemption indication information.

Figure 7:
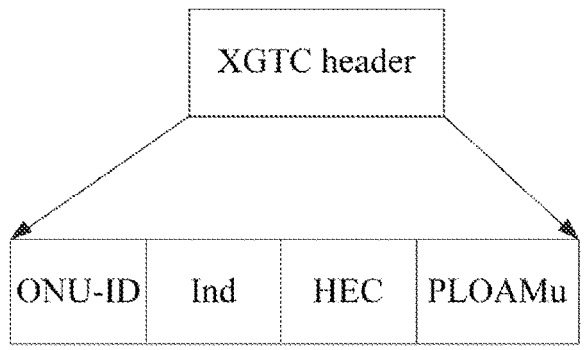
FIG. 7 is a structural diagram of an XGTC header provided in an embodiment of the present application.

The preemption prompt information is configured to instruct the receiver to compensate the preempted transmission entity or cache the preempted service. In some embodiments, the preemption prompt information may be added to an XGTC header of the XGTC burst. Referring to FIG. 7, FIG. 7 is a structural diagram of an XGTC header provided in an embodiment of the present application. The XGTC header includes an ONU-ID field (10 bits), an Ind field (9 bits), an HEC field (13 bits) and a PLOAMu field (0 or 48 bits). The ONU-ID is configured to uniquely identify the ONU. In some embodiments, whether preemption has occurred may be identified by the Ind field. In one way, whether preemption has occurred may be indicated by identifying bit7, for example, if bit7 is 1, it indicates that T-CONT bandwidth preemption has occurred, and if bit7 is 0, it indicates that T-CONT bandwidth preemption has not occurred. When the receiver detects that bit7 is 1, bandwidth compensation may be performed on the preempted T-CONT according to an identifier of the preempted T-CONT to ensure the transmission performance of the T-CONT.

Figure 8:
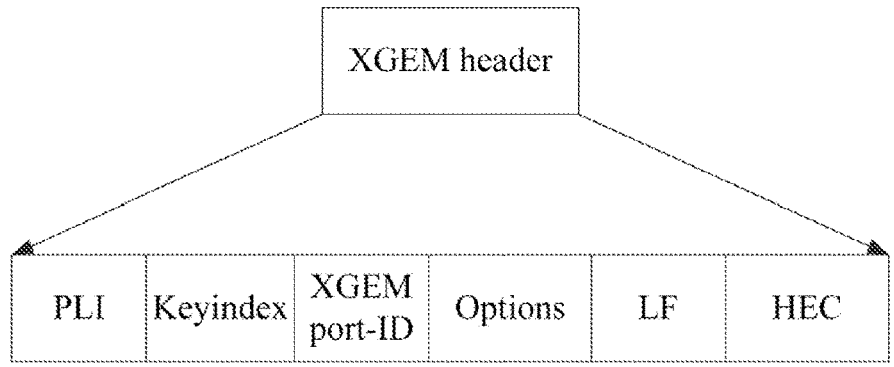
FIG. 8 is a structural diagram of an XGEM header provided in an embodiment of the present application.

In some embodiments, the preemption prompt information may also be added to the XGEM header. Referring to FIG. 8, FIG. 8 is a structural diagram of an XGEM header provided in an embodiment of the present application. The XGEM header includes a PLI field (14 bits), a Keyindex (2 bits), an XGEM port-ID field (16 bits), an Options field (18 bits), an LF field (1 bit) and an HEC field (13 bits). The XGEM port-ID is configured to uniquely identify a transmission channel of the T-CONT. In one way, a last bit of the Options field may be used to identify whether the transmission channel is preempted, for example, if the bit is 1, it indicates that preemption has occurred, and if the bit is 0, it indicates that preemption has not occurred. When the receiver detects that the last bit of the Options field is 1, a service corresponding to the transmission channel is cached, so that the rest of the subsequent data packets can be reassembled after arrival to obtain a complete data packet.

On the basis of the above embodiments, after configuring the attribute information of the transmission opportunity or transmission entity, the method further includes:
receiving, by the transmission entity allowed to be preempted, a transmission opportunity allocated by an Optical Line Terminal (OLT).

A bandwidth is taken as an example for the transmission opportunity. After determining a transmission entity allowed to preempt and a transmission entity allowed to be preempted, the OLT can continue to allocate the remaining bandwidth to the transmission entity allowed to be preempted, so as to prevent the subsequent transmission performance of the transmission entity from being affected due to bandwidth preemption.

On the basis of the above embodiments, the configuring the attribute information of the transmission entity includes:
configuring a transmission entity dedicated to be preempted.

A bandwidth is taken as an example for a transmission opportunity. In one way, a certain T-CONT allowed to be preempted may be configured as a dedicated T-CONT. The dedicated T-CONT is not linked to a specific service, that is, a bandwidth of the dedicated T-CONT is only available for preemption by other T-CONTs.

On the basis of the above embodiments, the method further includes:
when multiple transmission entities preempt a same transmission opportunity and a conflict occurs, receiving, by a preempted transmission entity corresponding to the transmission opportunity, a transmission opportunity allocated by the OLT; or receiving, by a preempting transmission entity, a transmission opportunity allocated by the OLT.

The service transmission method provided by this embodiment may be applied not only to the same sender, but also to different senders, and preemption among various transmission entities may be performed actively or passively. When the service transmission method is applied to different senders and actively executed, if multiple transmission entities preempt a same transmission opportunity and a conflict occurs, in order to eliminate the preemption conflict, in one way, a transmission opportunity can be allocated to the preempted transmission entity corresponding to the transmission opportunity, and in another way, a transmission opportunity can also be separately allocated to the preempting transmission entity.

Taking an ONU as the sender and the service transmission method applied between different ONUs as an example, when multiple ONUs preempt a same transmission opportunity and a conflict occurs, the OLT can continue to allocate a transmission opportunity to the preempted transmission entity or separately allocate a transmission opportunity to the preempting transmission entity.

Figure 9:
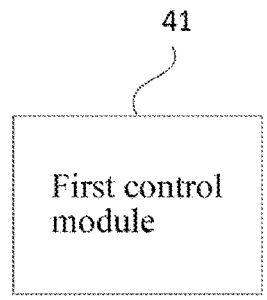
FIG. 9 is a structural diagram of a service transmission apparatus provided in an embodiment of the present application.

FIG. 9 is a structural diagram of a service transmission apparatus provided in an embodiment of the present application. The apparatus is arranged at a sender. Referring to FIG. 9, the apparatus includes a first control module 41.

The first control module 41 is configured to control one transmission entity to preempt a transmission opportunity of another transmission entity to perform service transmission.

An embodiment of the present application provides a service transmission apparatus. In the sender, one transmission entity preempts a transmission opportunity of another transmission entity to preferentially transmit a service, effectively reducing a service transmission delay of the preempting transmission entity.

On the basis of the above embodiment, the first control module 41 includes a first control unit.

The first control unit is configured to control the preempting transmission entity to preempt a transmission opportunity of the preempted transmission entity to perform service transmission if the preempted transmission entity is not currently transmitting a service.

On the basis of the above embodiment, the first control module 41 includes a second control unit.

The second control unit is configured to control the preempting transmission entity to preempt a transmission opportunity of the preempted transmission entity to perform service transmission after the preempted transmission entity completes service transmission if the preempted transmission entity is currently transmitting a service.

On the basis of the above embodiment, the first control module 41 includes a third control unit.

The third control unit is configured to control the preempting transmission entity to preempt a transmission opportunity of the preempted transmission entity and the preempted transmission entity to suspend the transmission of a current service if the preempted transmission entity is currently transmitting a service.

On the basis of the above embodiment, the apparatus further includes a second control module.

The second control module is configured to control the preempted transmission entity to continue to perform service transmission after the preemption.

On the basis of the above embodiment, the apparatus further includes an information sending module.

The information sending module is configured to send preemption indication information to the receiver after one transmission entity preempts the transmission opportunity of another transmission entity to perform service transmission, so that the receiver compensates the preempted transmission entity or caches the preempted service according to the preemption indication information.

On the basis of the above embodiment, the apparatus further includes a first configuration module.

The first configuration module is configured to configure attribute information of the transmission opportunity or the transmission entity before one transmission entity preempts a transmission opportunity of another transmission entity to perform service transmission.

The attribute information of the transmission opportunity includes a preemption attribute of the transmission opportunity, and the attribute information of the transmission entity includes a priority attribute and/or a preemption attribute of the transmission entity.

On the basis of the above embodiment, the apparatus further includes a third control module.

The third control module is configured to control the transmission entity allowed to be preempted to receive a transmission opportunity allocated by the OLT after the attribute information of the transmission opportunity or the transmission entity is configured.

On the basis of the above embodiment, the first configuration module is configured to:
configure a transmission entity dedicated to being preempted.

On the basis of the above embodiment, the apparatus further includes a fourth control module.

The fourth control module is configured to control the preempted transmission entity corresponding to the transmission opportunity to receive the transmission opportunity allocated by the OLT or control the preempting transmission entity to receive the transmission opportunity allocated by the optical line terminal when multiple transmission entities preempt a same transmission opportunity and a conflict occurs.

On the basis of the above embodiment, the apparatus further includes a fifth control module and a sixth control module.

The fifth control module is configured to control a transmission entity to acquire data segments to be transmitted at set intervals before one transmission entity preempts a transmission opportunity of another transmission entity to perform service transmission.

The sixth control module is configured to control the transmission entity to end acquiring the data segments to be transmitted and send the acquired data segments to be transmitted when the transmission entity is preempted.

The service transmission apparatus provided by the embodiment of the present application can execute the service transmission method in the above embodiment, and has corresponding functional modules and beneficial effects for executing the method.

Figure 10:
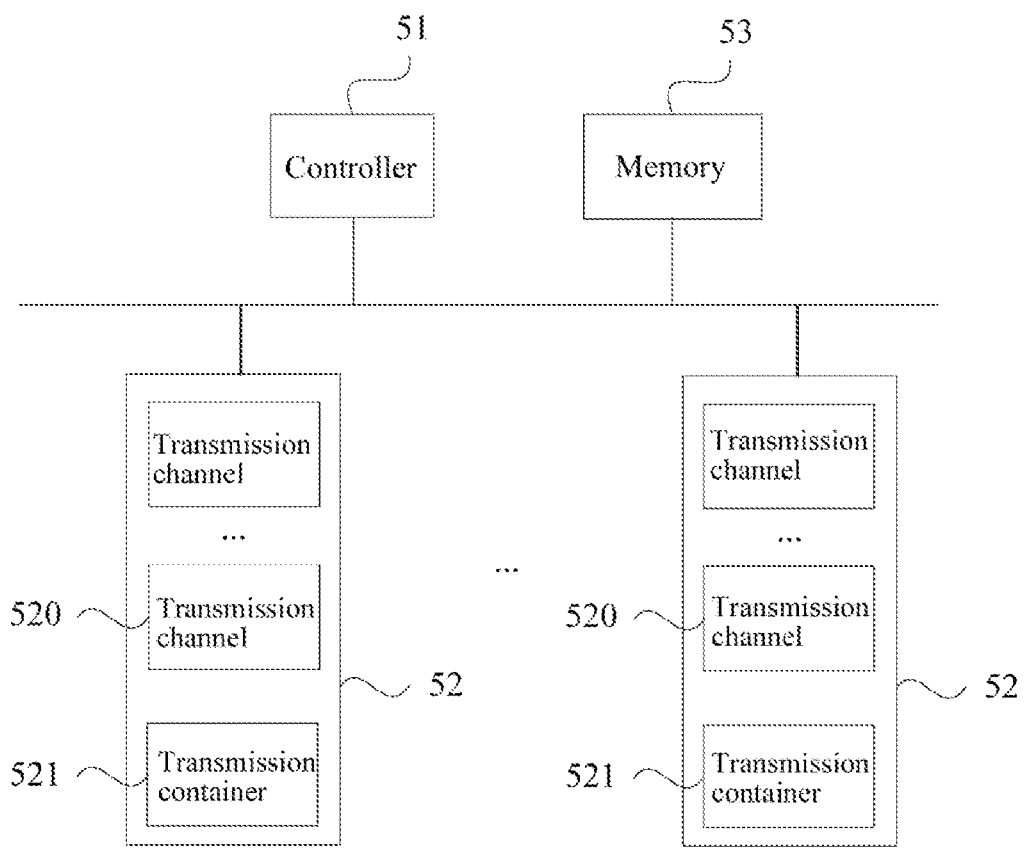
FIG. 10 is a structural diagram of a sender provided in an embodiment of the present application.

FIG. 10 is a structural diagram of a sender provided in an embodiment of the present application. The sender may be either an ONU or an OLT. In FIG. 10, using an ONU as the sender is taken as an example. Referring to FIG. 10, the sender includes a controller 51, a transmission entity 52 and a memory 53. The number of controllers 51 in the sender may be one or more, and one controller 51 is taken as an example in FIG. 10. The transmission entity 52 is configured to transmit the service received by the sender to the receiver. The same sender may include one or more transmission entities 52. In FIG. 10, multiple transmission entities 52 are taken as an example, and the transmission entities 52 include transmission channels 520 and transmission containers 521. The same transmission entity 52 includes one transmission container 521 and one or more transmission channels 520. In FIG. 10, multiple transmission channels 520 are taken as an example. When the sender includes multiple transmission entities 52, and each transmission entity 52 includes multiple transmission channels 520, different transmission channels 520 may correspond to different priorities, and different transmission containers 521 may correspond to different priorities. During service transmission, one transmission entity 52 may be controlled to preempt a transmission opportunity of another transmission entity 52 according to the attributes of each transmission channel 520 and each transmission container 521 to perform service transmission. The attributes of each transmission channel 520 and each transmission container 521 may be configured in advance.

The controller 51, the transmission entity 52 and the memory 53 can be connected by bus or other means. In FIG. 10, bus connection is taken as an example.

As a computer readable storage medium, the memory 53 may be configured to store software programs, computer executable programs and modules, such as program instructions/modules corresponding to the service transmission method in the embodiment of the present application. The controller 51 executes various functional applications and data processing of the sender by running software programs, instructions and modules stored in the memory 53, that is, implements the service transmission method of the above embodiment.

The memory 53 may mainly include a program storage area and a data storage area. The program storage area may store an operating system, and an application program required for at least one function. The data storage area may store data, etc., created according to the use of the terminal. In addition, the memory 53 may include a high-speed random access memory, and may also include nonvolatile memory, such as at least one magnetic disk storage device, flash memory device, or other nonvolatile solid state storage device. In some examples, the memory 53 may further include memories remotely located with respect to the controller 51, and these remote memories may be connected to the sender through networks. Examples of the above networks include, but not limited to, the Internet, intranet, local area network, mobile communication network and combinations thereof.

The sender provided by the embodiment of the present application belongs to the same concept as the service transmission method provided by the above embodiment. For technical details not described in detail in this embodiment, reference may be made to the above embodiments, and this embodiment has the same beneficial effect as executing the service transmission method.

An embodiment of the present application further provides a storage medium storing a computer program which, when executed by a controller, causes the controller to implement the service transmission method as described in the above embodiment of the present application.

Certainly, for the storage medium containing a computer executable instruction provided by the embodiment of the present application, the computer executable instruction is not limited to be configured to execute operations in the above service transmission method, but is also configured to execute related operations in the service transmission method provided in any embodiment of the present application, and has corresponding functions and beneficial effects.

Through the description of the above embodiments, those having ordinary skill in the art can clearly understand that the present application can be realized with the help of software and necessary general hardware, and certainly can also be realized by hardware, but in many cases the former is a better implementation. Based on this understanding, the technical schemes of the present application may be embodied in the form of software products in essence or the parts that make contributions to some situations, and the computer software products may be stored in a computer readable storage medium, such as a computer floppy disk, Read-Only Memory (ROM), Random Access Memory (RAM), Flash Memory (FLASH), hard disk or CD, etc., including a plurality of instructions to make a computer device (which may be a robot, a personal computer, a server, or a network device, or the like) executes the service transmission methods of the above embodiments of the present application.

An embodiment of the present application provides a service transmission method and apparatus, a sender and a storage medium. In the sender, one transmission entity preempts a transmission opportunity of another transmission entity to preferentially transmit a service, effectively reducing the service transmission delay of the preempting transmission entity.

Note that the above are only the preferred embodiments of the present application and the applied technical principles. Those having ordinary skill in the art will understand that the present application is not limited to the embodiments described here, and various obvious changes, readjustments and substitutions may be made by those having ordinary skill in the art without departing from the scope of protection of the present application. Therefore, although the present application has been illustrated in detail through the above embodiments, the present application is not limited to the above embodiments, but may also include other equivalent embodiments without departing from the concept of the present application, and the scope of the present application is determined by the scope of the appended claims.

What is claimed is:

1. A service transmission method, applied to a sender, for service transmission of a Passive Optical Network (PON) system, the method comprising:
    obtaining, by an another transmission entity, a transmission opportunity to perform service transmission;
    preempting, by one transmission entity, the transmission opportunity obtained by the another transmission entity,
    wherein each of the one transmission entity and the another transmission entity is a Transmission CONT (T-CONT), and the transmission opportunity is an uplink bandwidth allocated to the T-CONT,
    wherein the preempting occurs after the T-CONT of the another transmission entity has already obtained the transmission opportunity.

2. The method of claim 1, wherein the preempting, by the one transmission entity, the transmission opportunity of the another transmission entity to perform the service transmission comprises:
    preempting, by a preempting transmission entity, a transmission opportunity of a preempted transmission entity to perform service transmission in response to the preempted transmission entity being not currently transmitting a service.

3. The method of claim 1, wherein the preempting, by the one transmission entity, the transmission opportunity of the another transmission entity to perform the service transmission comprises:
    preempting, by a preempting transmission entity, a transmission opportunity of a preempted transmission entity to perform service transmission after the preempted transmission entity completes service transmission in response to the preempted transmission entity being currently transmitting a service.

4. The method of claim 1, wherein the preempting, by the one transmission entity, the transmission opportunity of the another transmission entity to perform the service transmission comprises:
    preempting, by a preempting transmission entity, a transmission opportunity of a preempted transmission entity, and
    suspending, by the preempted transmission entity, the transmission of a current service, in response to the preempted transmission entity being currently transmitting a service.

5. The method of claim 1, further comprising:
    after the preemption, continuing, by the preempted transmission entity, to perform service transmission.

6. The method of claim 1, wherein after the preempting, by the one transmission entity, the transmission opportunity of the another transmission entity to perform the service transmission, the method further comprises:
    sending preemption indication information to a receiver, so that the receiver compensates the preempted transmission entity or caches a preempted service according to the preemption indication information.

7. The method of claim 1, wherein prior to the preempting, by the one transmission entity, the transmission opportunity of the another transmission entity to perform the service transmission, the method further comprises:
configuring attribute information of the transmission opportunity or the one transmission entity and the another transmission entity,
wherein the attribute information of the transmission opportunity comprises a preemption attribute of the transmission opportunity configured to identify whether the transmission opportunity is allowed to be preempted, and
the attribute information of the one transmission entity and the another transmission entity comprises a priority attribute and/or a preemption attribute of the one transmission entity and the another transmission entity, the priority attribute is used to identify a priority of the one transmission entity and the another transmission entity, the preemption attribute is used to identify whether the one transmission entity or the another transmission entity is allowed to preempt.

8. The method of claim 7, wherein after configuring the attribute information of the transmission opportunity or the transmission entity, the method further comprises:
receiving, by the another transmission entity that is preempted, a transmission opportunity allocated by an optical line terminal.

9. The method of claim 7, wherein configuring the attribute information of the transmission entity comprises:
configuring the another transmission entity to be dedicated to be preempted.

10. The method of claim 1, further comprising:
in response to multiple transmission entities preempting a same transmission opportunity and a conflict occurring, receiving, by the preempted transmission entity corresponding to the transmission opportunity, the transmission opportunity allocated by the optical line terminal, or
receiving, by the preempting transmission entity, the transmission opportunity allocated by the optical line terminal.

11. The method of claim 1, wherein prior to the preempting, by the one transmission entity, the transmission opportunity of the another transmission entity to perform the service transmission, the method further comprises:
acquiring, by the transmission entity, a data segment to be transmitted at a set interval; and
in response to the transmission entity being preempted, ending, by the transmission entity, acquisition of the data segment to be transmitted and sending the acquired data segment to be transmitted.

12. The method of claim 1, wherein the method is executed by a controller in the sender.

13. The method of claim 2, wherein after the preempting, by the one transmission entity, the transmission opportunity of the another transmission entity to perform the service transmission, the method further comprises:
sending preemption indication information to a receiver, so that the receiver compensates the preempted transmission entity or caches a preempted service according to the preemption indication information.

14. The method of claim 3, wherein after the preempting, by the one transmission entity, the transmission opportunity of the another transmission entity to perform the service transmission, the method further comprises:
sending preemption indication information to a receiver, so that the receiver compensates the preempted transmission entity or caches a preempted service according to the preemption indication information.

15. The method of claim 4, wherein after the preempting, by the one transmission entity, the transmission opportunity of the another transmission entity to perform the service transmission, the method further comprises:
sending preemption indication information to a receiver, so that the receiver compensates the preempted transmission entity or caches a preempted service according to the preemption indication information.

16. The method of claim 2, wherein prior to the preempting, by the one transmission entity, the transmission opportunity of the another transmission entity to perform the service transmission, the method further comprises:
configuring attribute information of the transmission opportunity or the transmission entity,
wherein the attribute information of the transmission opportunity comprises a preemption attribute of the transmission opportunity, and
the attribute information of the transmission entity comprises a priority attribute and/or a preemption attribute of the transmission entity.

17. The method of claim 3, wherein prior to the preempting, by the one transmission entity, the transmission opportunity of the another transmission entity to perform the service transmission, the method further comprises:
configuring attribute information of the transmission opportunity or the transmission entity,
wherein the attribute information of the transmission opportunity comprises a preemption attribute of the transmission opportunity, and
the attribute information of the transmission entity comprises a priority attribute and/or a preemption attribute of the transmission entity.

18. The method of claim 4, wherein prior to the preempting, by the one transmission entity, the transmission opportunity of the another transmission entity to perform the service transmission, the method further comprises:
configuring attribute information of the transmission opportunity or the transmission entity,
wherein the attribute information of the transmission opportunity comprises a preemption attribute of the transmission opportunity, and
the attribute information of the transmission entity comprises a priority attribute and/or a preemption attribute of the transmission entity.

19. A service transmission apparatus, arranged at a sender, for service transmission of a Passive Optical Network (PON) system, comprising:
a first control module configured to control one transmission entity to:
preempt a transmission opportunity of another transmission entity to perform service transmission, wherein the preempt is after the another transmission entity obtained the transmission opportunity,
wherein each of the one transmission entity and the another transmission entity is a Transmission CONT (T-CONT), and the transmission opportunity is an uplink bandwidth allocated to the T-CONT,
wherein the preempting occurs after the T-CONT of the another transmission entity has already obtained the transmission opportunity.

20. A non-transitory computer readable storage medium storing a computer program which, when executed by a controller, causes the controller to carry out a service transmission method, applied to a sender, for service transmission of a Passive Optical Network (PON) system, the method comprising:
- obtaining, by an another transmission entity, a transmission opportunity to perform service transmission;
- preempting, by one transmission entity, the transmission opportunity obtained by the another transmission entity,
- wherein each of the one transmission entity and the another transmission entity is a Transmission CONT (T-CONT), and the transmission opportunity is an uplink bandwidth allocated to the T-CONT,
- wherein the preempting occurs after the T-CONT of the another transmission entity has already obtained the transmission opportunity.

\* \* \* \* \*